United States Patent
Bashir et al.

(10) Patent No.: US 12,553,077 B2
(45) Date of Patent: Feb. 17, 2026

(54) LINKED DUAL BARCODE INSERTION CONSTRUCTS

(71) Applicant: GOOGLE LLC, Mountain View, CA (US)

(72) Inventors: Ali Bashir, Mountain View, CA (US); Marc Berndl, Mountain View, CA (US); Annalisa Pawlosky, Mountain View, CA (US); Jun Kim, Mountain View, CA (US)

(73) Assignee: Google LLC, Mountain View, CA (US)

( * ) Notice: Subject to any disclaimer, the term of this patent is extended or adjusted under 35 U.S.C. 154(b) by 483 days.

(21) Appl. No.: 18/027,085

(22) PCT Filed: Oct. 1, 2020

(86) PCT No.: PCT/US2020/053715
§ 371 (c)(1),
(2) Date: Mar. 17, 2023

(87) PCT Pub. No.: WO2022/071952
PCT Pub. Date: Apr. 7, 2022

(65) Prior Publication Data
US 2023/0332205 A1    Oct. 19, 2023

(51) Int. Cl.
*C12P 19/34* (2006.01)
*C12Q 1/6806* (2018.01)
*G16B 30/10* (2019.01)

(52) U.S. Cl.
CPC ............ *C12Q 1/6806* (2013.01); *G16B 30/10* (2019.02)

(58) Field of Classification Search
CPC .................................................. C12Q 1/6869
See application file for complete search history.

(56) References Cited

U.S. PATENT DOCUMENTS

| | | | | |
|---|---|---|---|---|
| 2012/0208724 A1* | 8/2012 | Steemers | ............. | C12Q 1/6869 506/26 |
| 2015/0232883 A1* | 8/2015 | Dahlman | ............. | C12N 15/907 435/320.1 |
| 2015/0337298 A1* | 11/2015 | Xi | .................. | C12N 15/1065 506/26 |
| 2021/0403904 A1* | 12/2021 | Fan | ................. | C12Q 1/6806 |
| 2023/0332220 A1* | 10/2023 | Bashir | ................. | C12Q 1/6806 |
| 2024/0344112 A1* | 10/2024 | Bashir | ................. | C12Q 1/6869 |

FOREIGN PATENT DOCUMENTS

| | | |
|---|---|---|
| WO | 2012/061832 | 5/2012 |
| WO | 2020/061529 | 3/2020 |

OTHER PUBLICATIONS

Costello et al., "Characterization and remediation of sample index swaps by non-redundant dual indexing on massively parallel sequencing platforms", BMC Genomics, Biomed Central Ltd, London, UK, vol. 19, No. 1, May 8, 2018, pp. 1-10.
Wright et al., "Quality filtering of illumina index reads mitigates sample cross-talk", BMC Genomics, Biomed Central Ltd, London, UK, vol. 17, No. 1, Nov. 4, 2016, pp. 1-7.
The International Search Report (ISR) with Written Opinion for PCT/US2020/053716 dated Jun. 8, 2021, pp. 1-15.
Wong, Alan S L et al. "Multiplexed barcoded CRISPR-Cas9 screening enabled by CombiGEM" Proceedings of the National Academy of Sciences, National Academy of Sciences (2016) vol. 113(9), pp. 2544-2549.

* cited by examiner

*Primary Examiner* — Kenneth R Horlick
(74) *Attorney, Agent, or Firm* — McDonnell Boehnen Hulbert & Berghoff LLP

(57) ABSTRACT

Contemporary gene sequencing techniques, including "Next Generation Sequencing" techniques, can include sequencing a plurality of fragments of a target polynucleotide. However, tire limitations of existing sequencing techniques, and the often repetitive or otherwise difficult-to-sequence structure of natural polynucleotides, means that it can be difficult and/or expensive to generate accurate sequences. Methods provided herein include inserting dual polynucleotide 'barcodes,' along with neighboring primer sequences, into a target polynucleotide prior to other sequencing processes. These inserted barcodes can improve the accuracy of sequences generated for the target by adding 'noise' into the target, allowing subsequent sequencing techniques (e.g., alignment, stitching, etc.) to more accurately estimate the target-plus-barcodes sequence. The primers can cause the fragments to begin at points within the target that correspond to the beginning of other sequences, facilitating the stitching of sequence ends together. The barcodes can then be removed to provide the sequence of the target polynucleotide.

19 Claims, 8 Drawing Sheets

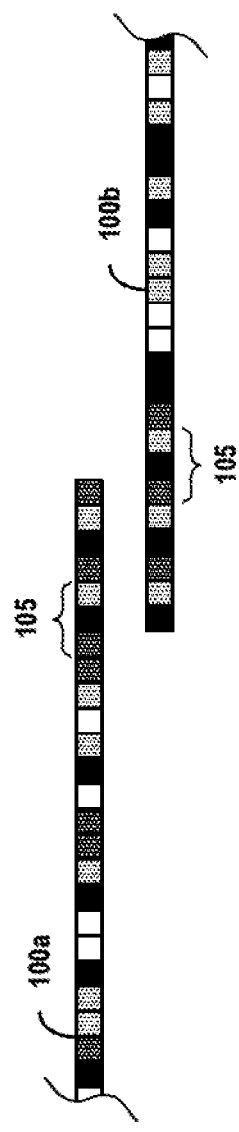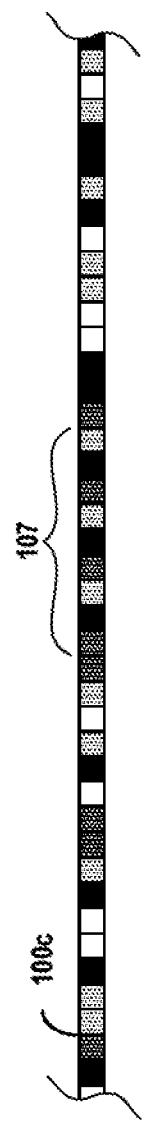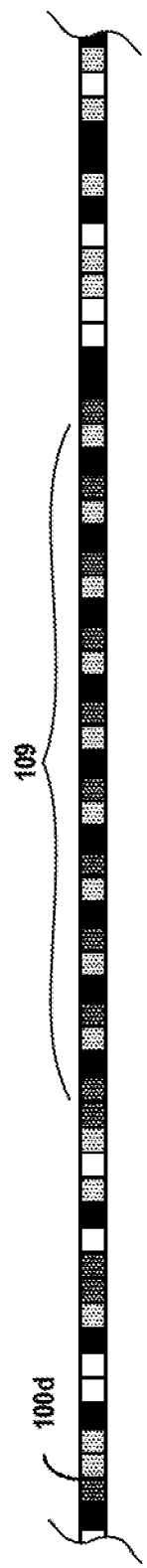
FIGURE 1A
FIGURE 1B
FIGURE 1C

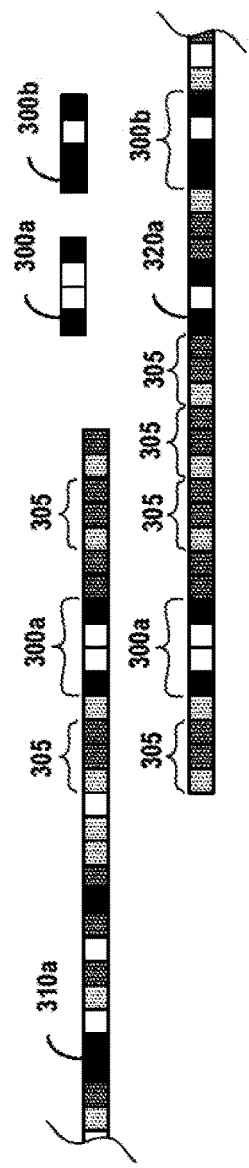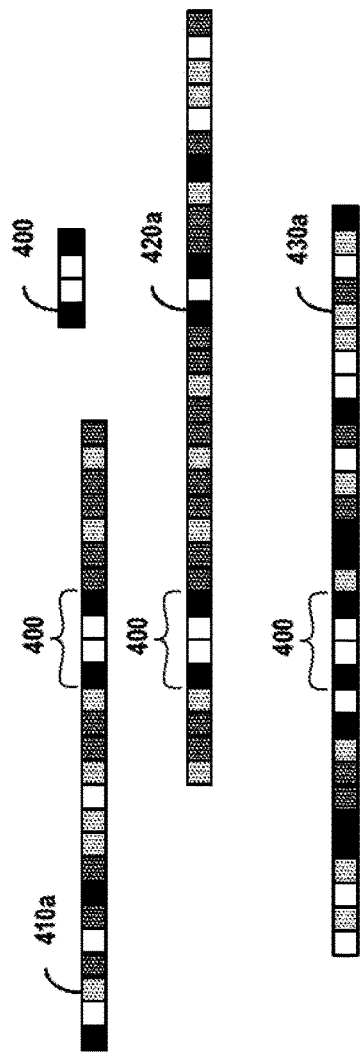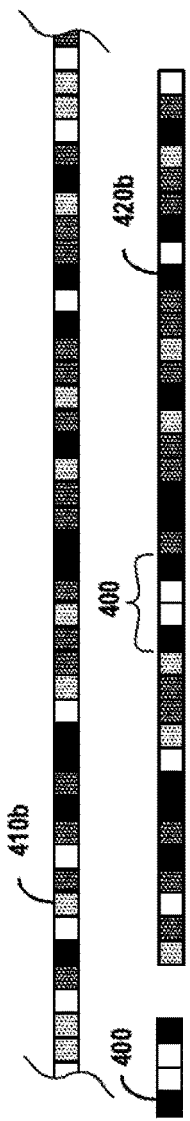
FIGURE 3
FIGURE 4A
FIGURE 4B

```
┌─────────────────────────────────────────────────────────────┐
│ INSERT, INTO A TARGET POLYNUCLEOTIDE THAT IS CONTAINED WITHIN│
│ A SAMPLE, A PLURALITY OF POLYNUCLEOTIDE BARCODES, WHEREIN   │
│ THE PLURALITY OF INSERTED POLYNUCLEOTIDE BARCODES INCLUDES  │
│ A FIRST POLYNUCLEOTIDE BARCODE AND A SECOND POLYNUCLEOTIDE  │
│                         BARCODE                              │
└─────────────────────────────────────────────────────────────┘
                              ↓ —1110                    1100
┌─────────────────────────────────────────────────────────────┐
│ SUBSEQUENT TO INSERTING THE PLURALITY OF POLYNUCLEOTIDE     │
│ BARCODES INTO THE TARGET NUCLEOTIDE, SEQUENCE AT LEAST A    │
│ PORTION OF THE SAMPLE A PLURALITY OF TIMES TO OBTAIN A      │
│ PLURALITY OF READS OF THE TARGET POLYNUCLEOTIDE, WHEREIN A  │
│ FIRST READ OF THE PLURALITY OF READS INCLUDES THE FIRST     │
│ POLYNUCLEOTIDE BARCODE, AND WHEREIN A SECOND READ OF THE    │
│ PLURALITY OF READS INCLUDES THE FIRST POLYNUCLEOTIDE        │
│ BARCODE AND THE SECOND POLYNUCLEOTIDE BARCODE               │
└─────────────────────────────────────────────────────────────┘
                              ↓ —1120   —330
┌─────────────────────────────────────────────────────────────┐
│ DETERMINE A SEQUENCE FOR THE TARGET POLYNUCLEOTIDE BASED    │
│ ON THE PLURALITY OF READS OF THE TARGET POLYNUCLEOTIDE      │
└─────────────────────────────────────────────────────────────┘
                                                        —1132
     ┌─────────────────────────────────────────────────────────┐
     │ DETERMINE A PRELIMINARY SEQUENCE FOR THE TARGET         │
     │ POLYNUCLEOTIDE, WHEREIN DETERMINING THE PRELIMINARY     │
     │ SEQUENCE COMPRISES STITCHING TOGETHER THE FIRST AND     │
     │ SECOND READS SUCH THAT THE FIRST POLYNUCLEOTIDE BARCODE IN│
     │ EACH OF THE FIRST AND SECOND READS IS OVERLAPPING       │
     ├─────────────────────────────────────────────────────────┤
     │ REMOVE THE SEQUENCE OF THE FIRST AND SECOND             │
     │ POLYNUCLEOTIDE BARCODES FROM THE PRELIMINARY SEQUENCE   │
     └─────────────────────────────────────────────────────────┘
                                                         —1134
```

FIGURE 11

LINKED DUAL BARCODE INSERTION CONSTRUCTS

CROSS-REFERENCE TO RELATED APPLICATION

This application is a U.S. National Phase of International Application No. PCT/US2020/053715, filed Oct. 1, 2020, which is incorporated by reference herein in its entirety.

BACKGROUND

Early DNA sequencing techniques, such as chain-termination methods, provided reliable solutions for reading individual DNA fragments. See Sanger, F. et. al. (1977) DNA sequencing with chain-terminating inhibitors. Proc. Natl. Acad. Sci. U.S.A. 74, 5463-5467. While these first-generation technologies are effective for sequencing target genes, applying them to sequencing entire chromosomes or genomes is costly and expensive. For example, the first sequencing of a human genome—which was accomplished using the Sanger method—cost hundreds of millions of dollars and took over a decade to complete. This high cost was largely due to the sequential nature of first-generation sequencing methods; each fragment had to be individually read and manually assembled to construct a full genome.

Next generation sequencing (NGS) technologies have significantly reduced the cost of DNA sequencing by parallelizing DNA fragment reading. Some NGS methods are capable of performing millions of sequence reads concurrently, generating data for millions of base pairs in a matter of hours. See Hall, N. (2007) Advanced sequencing technologies and their wider impact in microbiology. The Journal of Experimental Biology, 209, 1518-1525. Many NGS technologies have been proposed, and employ various chemical processes, use varying read lengths, and have demonstrated various ranges of accuracy. See Metzker, M. (2010) Sequencing technologies—the next generation. Nature Reviews, Genetics, Volume 11, 31-46; see also Shendure, J. et. al. (2008) Next-generation DNA sequencing. Nature Reviews, Biotechnology, Volume 26, Number 10, 1135-1145.

NGS methods generally involve separating a DNA sample into fragments and reading the nucleotide sequence of those fragments in parallel. The resulting data generated from this process includes read data for each of those fragments, which contains a continuous sequence of nucleotide base pairs (G, A. T. C). However, while the arrangement of base pairs within a given fragment read is known, the arrangement of the fragment reads with respect to each other is not. Thus, to determine the sequence of a larger DNA strand (such as a gene or chromosome), read data from multiple fragments must be aligned. This alignment is relative to other read fragments, and may include overlapping fragments, depending upon the particular NGS method used. Some NGS methods use computational techniques and software tools to carry out read data alignment.

Accurate sequence read alignment is the first step in identifying genetic variations in a sample genome. The diverse nature of genetic variation can cause alignment algorithms and techniques to align sequence reads to incorrect locations within the genome. Furthermore, the read process used to generate sequence reads may be complex and susceptible to errors. Thus, many sequence read alignment techniques can misalign a sequence read within a genome, which can lead to incorrect detection of variants in subsequent analyses.

Once the read data has been aligned, that aligned data may be analyzed to determine the nucleotide sequence for a gene locus, gene, or an entire chromosome. However, differences in nucleotide values among overlapping read fragments may be indicative of a variant, such as a single-nucleotide polymorphism (SNP) or an insertion or deletion (INDELs), among other possible variants. For example, if read fragments that overlap at a particular locus differ, those differences might be indicative of a heterozygous SNP. As another example, if overlapping read fragments are the same at a single nucleotide, but differ from a reference genome, that gene locus or gene may be a homozygous SNP with respect to that reference genome. Accurate determination of such variants is an important aspect of genome sequencing, since those variants could represent mutations, genes that cause particular diseases, and/or otherwise serve to genotype a particular DNA sample.

The demand for high efficiency and low-cost DNA sequencing has increased in recent years. Although NGS technologies have dramatically improved upon first-generation technologies, the highly-parallelized nature of NGS techniques has presented challenges not encountered in earlier sequencing technologies. Errors in the read process can adversely impact the alignment of the resulting read data, and can subsequently lead to inaccurate sequence determinations. Furthermore, read errors can lead to erroneous detection of variants.

A more comprehensive and accurate understanding of both the human genome as a whole and the genomes of individuals can improve medical diagnoses and treatment. NGS technologies have reduced the time and cost of sequencing an individual's genome, which provides the potential for significant improvements to medicine and genetics in ways that were previously not feasible. Understanding genetic variation among humans provides a framework for understanding genetic disorders and Mendelian diseases. However, discovering these genetic variations depends upon reliable read data and accurate read sequence alignment.

SUMMARY

In a first aspect, a method is provided that includes: (i) adding a probe to a sample that contains a target polynucleotide, wherein the probe comprises a payload polynucleotide and an insertion vector, wherein the payload polynucleotide comprises a first polynucleotide barcode, a reverse primer, a forward primer, and a second polynucleotide barcode, and wherein the insertion vector inserts the payload polynucleotide into the target polynucleotide; and (ii) applying an amplification agent to generate: (1) a first copy of the target polynucleotide, with the payload polynucleotide inserted, beginning from the reverse primer such that the first copy includes a complement of the first polynucleotide barcode proximate to an end of the first copy, and (2) a second copy of the target polynucleotide, with the payload polynucleotide inserted, beginning from the forward primer such that the second copy includes a complement of the second polynucleotide barcode proximate to an end of the second copy.

The insertion vector may comprise Tn5 transposase. The insertion vector may comprise CRISPR-Cas9.

Subsequent to adding the probe to the sample, at least a portion of the sample may be sequenced a plurality of times to obtain a read of the first copy of the target polynucleotide and a read of the second copy of the target polynucleotide. A sequence for the target polynucleotide may be determined based on the read of the first copy and the read of the second copy. Determining the sequence for the target polynucleotide may comprise determining a preliminary sequence for the target polynucleotide based on the read of the first copy and the read of the second copy, and removing the sequence of the first and second polynucleotide barcodes from the preliminary sequence. Determining the preliminary sequence may comprise stitching together the end of the first copy to the end of the second copy.

The probe may be sequenced to generate a probe sequence and based on the probe sequence, respective sequences for the first and second polynucleotide barcodes may be determined. It may be determined that the first and second polynucleotide barcodes correspond to each other.

Stitching together the end of the first copy to the end of the second copy may be performed responsive to determining that the first copy contains the determined sequence for the first polynucleotide barcode proximate to the end of the first copy and that the second copy contains the determined sequence for the second polynucleotide barcode proximate to the end of the second copy.

Subsequent to applying the amplification agent, an additional plurality of polynucleotide barcodes may be inserted into the target polynucleotide, to obtain additional copies of the target polynucleotide with the additional plurality of polynucleotide barcodes inserted therein. Subsequent to inserting the additional plurality of polynucleotide barcodes into the target polynucleotide, at least a portion of the sample may be sequenced a plurality of times to obtain reads of the additional copies of the target polynucleotide. Determining the sequence for the target polynucleotide may comprise determining the sequence based on the reads of the additional copies of the target polynucleotide.

The method may include, prior to adding the probe to the sample, sequencing at least a portion of the sample a plurality of times to obtain a plurality of unmodified reads of the target polynucleotide, wherein removing the first and second polynucleotide barcodes from the preliminary sequence comprises comparing the preliminary sequence to at least one read of the plurality of unmodified reads of the target polynucleotide.

The target polynucleotide may comprise DNA. The target polynucleotide may comprise RNA. The target polynucleotide may be a first isoform of an RNA sequence, and the sample may contain a second isoform of the RNA sequence. The first isoform may differ from the second isoform.

The first and second polynucleotide barcodes may have the same sequence. The second polynucleotide barcode may be a reversed, complementary version of the first polynucleotide barcode.

In another aspect, a non-transitory computer readable medium is provided having stored therein instructions executable by a computing device to cause the computing device to determine a sequence for a target polynucleotide according to the methods described herein.

In still another aspect, a probe is provided that includes: (i) a payload polynucleotide, wherein the payload polynucleotide comprises a first polynucleotide barcode, a reverse primer, a forward primer, and a second polynucleotide barcode; and (ii) an insertion vector, wherein the insertion vector is configured to insert the payload polynucleotide into a target polynucleotide.

In yet another aspect, a method for generating a payload polynucleotide is provided. The method includes: (i) obtaining a template polynucleotide that includes a first polynucleotide barcode and a first amplification primer; (ii) forming, on the template polynucleotide, a complementary polynucleotide such that the complementary polynucleotide includes a second amplification primer and a second polynucleotide barcode; (iii) forming a hairpin between the template polynucleotide and the complementary polynucleotide; and (iv) dissociating the complementary polynucleotide from the template polynucleotide via a denaturing process.

The insertion vector may comprise Tn5 transposase. The insertion vector may comprise CRISPR-Cas9.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 1A illustrates example polynucleotides.
FIG. 1B illustrates example polynucleotides.
FIG. 1C illustrates example polynucleotides.
FIG. 3 illustrates an example alignment of two nucleotide sequences.
FIG. 4A illustrates an example identification of a known sequence that has been inserted into two target polynucleotides.
FIG. 4B illustrates an example identification of a known sequence that has been inserted into a target polynucleotide.
FIG. 11 illustrates a flowchart of an example method.

DETAILED DESCRIPTION

Figure 2A:
FIG. 2A illustrates aspects of an example method for improving polynucleotide sequencing by insertion of additional known sequences into a target polynucleotide.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. Introduction

Next generation sequencing (NGS) has dramatically reduced the time and cost required to sequence an entire genome. Previous techniques involved sequentially reading out DNA fragments and having trained biochemists arrange the read data to determine the sequence of entire chromosomes. NGS technologies parallelize the sequencing process, allowing millions of DNA fragments to be read simultaneously. Automated computational analyses then attempt to align the read data to determine the nucleotide sequence of a gene locus, gene, chromosome, or entire genome.

The increasing prevalence of NGS technologies has generated a substantial amount of genome data. Analysis of this genome data—both for an individual sample and for multiple samples—can provide meaningful insights about the genetics of a sample (e.g., an individual human patient) or species. Variations between genomes may correspond to different traits or diseases within a species. Variations may take the form of single nucleotide polymorphisms (SNPs), insertions and deletions (INDELs), and structural differences in the DNA itself such as copy number variants (CNVs) and chromosomal rearrangements. By studying these variations, scientists and researchers can better understand differences within a species, the causes of certain diseases, and can provide better clinical diagnoses and personalized medicine for patients.

The quality and accuracy of genome datasets is crucial to subsequent analyses and research performed on those datasets. However, imperfections in the NGS technologies used to generate these genome datasets can result in errors in both the read process itself and the read data alignment, leading to uncertainty in the output sequence(s). If an NGS machine incorrectly reads a nucleobase and records it in the read data, subsequent analysis could incorrectly identify a variant at that locus. If there are inaccuracies in the alignment of the read data, incorrect variant detection might also occur. Additionally or alternatively, an incorrect number of a repeated sequence could be detected, or an indel could be incorrectly detected or omitted. If these sources of error are left unaccounted for, false positive variant detection could lead to incorrect clinical diagnoses or the discovery of non-existent variants.

To mitigate these errors, some NGS analysis pipelines include filtering steps to detect and discard false positive variant detections. As used herein, "variant call" may be used to refer to a variant detection. Some filtering techniques employ hard filters that analyze one or more aspects of a variant call, compare it against one or more criteria, and provide a decision as to whether it is a true positive variant call or a false positive variant call. For example, if multiple read fragments aligned at a particular locus show three or more different bases, a hard filter might determine that the variant call is a false positive.

Other filtering techniques employ statistical or probabilistic models, and may involve performing statistical inferences based on one or more hand-selected variables of the variant call. A variant call might include a set of read data of DNA fragments aligned with respect to each other. Each DNA fragment read data may include metadata that specifies a confidence level of the accuracy of the read (i.e., the quality of the bases), information about the process used to read the DNA fragments, and other information. DNA sequencing experts may choose features of a variant call that they believe to differentiate true positives from false positives. Then, a statistical model (e.g., a Bayesian mixture model) may be trained using a set of labeled examples (e.g., known true variant calls and the quantitative values of the hand-selected features). Once trained, new variant calls may be provided to the statistical model, which can determine a confidence level indicative of how likely the variant call is a false positive.

False positive variant calls may be avoided or mitigated by performing more accurate read sequence alignment, and/or by improving the robustness of the variant callers themselves. Some variant callers may detect SNPs and INDELs via local de-novo assembly of haplotypes. When such a variant caller encounters a read pileup region indicative of a variant, the variant caller may attempt to reassemble or realign the sequence reads. By analyzing these realignments, these types of variant callers may evaluate the likelihood that the read pileup region contains a variant.

Many different read processes may be used to generate DNA fragment read data of a sample. Each read process may vary by read length, amplification method, materials used, and the technique used (e.g., chain termination, ligation, etc.). The nature and source of the errors of each read process may vary. Thus, the features that distinguish incorrect alignments, invalid variant calls, or false positive variant detections may differ among read processes.

Note that a "sample" may be a sample from a biological organism (e.g., a human, an animal, a plant, etc.) and/or may be a sample containing synthetic contents. For example, the sample could contain synthetic DNA (or RNA, or some other synthetic polynucleotide) created, e.g., to store information in the sequence or other characteristics of the synthetic DNA. Accordingly, the methods described herein could be applied to extract the information stored in such a sample.

II. Terminology

A. Next Generation Sequencing (NGS)

NGS generally refers to DNA sequencing techniques that involve sequencing multiple DNA fragments of a sample in parallel. The output data may contain nucleotide sequences for each read, which may then be assembled to form longer sequences within a gene, an entire gene, a chromosome, or a whole genome. The specific aspects of a particular NGS technique may vary depending on the sequencing instrument, vendor, and a variety of other factors. Secondary analyses may then involve aligning/assembling the reads to generate a predicted target sequence, detecting variants within the sample, etc.

An example polynucleotide (e.g., DNA) sequencing pipeline may include polynucleotide sequencing (e.g., using one or more next-generation DNA sequencers), read data alignment, and variant calling. As described herein, a "pipeline" may refer to a combination of hardware and/or software that receives an input material or data and generates a model or output data. The example pipeline receives a polynucleotide-containing sample as input, which is sequenced by polynucleotide sequencer(s) to output read data. Read data alignment occurs by receiving the raw input read data and generating aligned read data. Variant calling can then proceed by analyzing the aligned read data and outputting potential variants.

The input sample may be a biological sample (e.g., biopsy material) taken from a particular organism (e.g., a human). The sample may be isolated DNA, RNA, or some other polynucleotide and may contain individual genes, gene clusters, full chromosomes, or entire genomes. Polynucleotides of interest in a sample can include natural or artificial DNA, RNA, or other polynucleotide formed of some other type of nucleotide and/or combination of types of nucleotides. The sample may include material or DNA isolated from two or more types of cells within a particular organism. Where the sample contains RNA, it may contain multiple different isoforms of a particular RNA sequence (e.g., relating to respective different isoforms of a folded RNA, protein generated from the RNA by a ribosome or other structure(s), or some other RNA-related substance).

The polynucleotide sequencer(s) may include any scientific instrument that performs polynucleotide sequencing (e.g., DNA sequencing, RNA sequencing) autonomously or semi-autonomously. Such a polynucleotide sequencer may receive a sample as an input, carry out steps to break down and analyze the sample, and generate read data representing sequences of read fragments of the polynucleotide(s) in the sample. A polynucleotide sequencer may subject DNA (or some other polynucleotide) from the sample to fragmentation and/or ligation to produce a set of polynucleotide fragments. The fragments may then be amplified (e.g., using polymerase chain reaction (PCR)) to produce copies of each polynucleotide fragment. Then, the polynucleotide sequencer may sequence the amplified polynucleotide fragments using, for example, imaging techniques that illuminate the fragments and measure the light reflecting off them to determine the nucleotide sequence of the fragments. Those nucleotide sequence reads may then be output as read data (e.g., a text file with the nucleotide sequence and other metadata) and stored onto a storage medium.

Read data alignment can include any combination of hardware and software that receives raw polynucleotide fragment read data and generates the aligned read data. In some embodiments, the read data is aligned to a reference genome (although, one or more nucleotides or segments of nucleotides within a read fragment may differ from the reference genome). In some instances, the polynucleotide sequencer may also align the read fragments and output aligned read data.

Aligned read data may be any signal or data indicative of the read data and the manner in which each fragment in the read data is aligned. An example data format of the aligned read data is the SAM format. A SAM file is a tab-delimited text file that includes sequence alignment data and associated metadata. Other data formats may also be used (e.g., pileup format).

A variant calling method/system may be any combination of hardware and software that detects variants in the aligned read data and outputs potential variants. The variant caller may identify nucleotide variations among multiple aligned reads at a particular location on a gene (e.g., a heterozygous SNP), identify nucleotide variations between one or more aligned reads at a particular location on a gene and a reference genome (e.g., a homozygous SNP), and/or detect any other type of variation within the aligned read data. The variant caller may output data indicative of the detected variants in a variety of file formats, such as variant call format (VCF) which specifies the location (e.g., chromosome and position) of the variant, the type of variant, and other metadata.

B. Reference Genome

As described herein, a "reference genome" may refer to polynucleotide sequencing data and/or an associated predetermined nucleotide sequence for a particular sample. This could include DNA sequences (e.g., for the genomes of plants, animals, bacteria, DNA viruses, etc.), RNA sequences (e.g., for the genomes of RNA viruses), or some other polynucleotide sequence of an organism of interest. A reference genome may also include information about the sample, such as its biopsy source, gender, species, phenotypic data, and other characterizations. A reference genome may also be referred to as a "gold standard" or "platinum" genome, indicating a high confidence of the accuracy of the determined nucleotide sequence. An example reference genome is the NA12878 sample data and genome. In examples wherein the sample contains a synthetic DNA or other synthetic polynucleotide (e.g., samples wherein containing synthetic DNA used to store information in the sequence or other characteristics of the synthetic DNA), the reference genome could be a record of a baseline, unmodified, or otherwise reference state of the synthetic DNA in the sample.

C. Variant Types and Detection

As described herein, a genome may contain multiple chromosomes, each of which may include genes. Each gene may exist at a position on a chromosome referred to as the "gene locus." Differences between genes (i.e., one or more variants at a particular gene locus) in different samples may be referred to as an allele. Collectively, a particular set of alleles in a sample may form the "genotype" of that sample.

Two genes, or, more generally, any nucleotide sequences that differ from each other (in terms of length, nucleotide bases, etc.) may include one or more variants. In some instances, a single sample may contain two different alleles at a particular gene locus; such variants may be referred to as "heterozygous" variants. Heterozygous variants may exist when a sample inherits one allele from one parent and a different allele from another parent; since diploid organisms (e.g., humans) inherit a copy of the same chromosome from each parent, variations likely exist between the two chromosomes. In other instances, a single sample may contain a gene that varies from a reference genome; such variants may be referred to as "homozygous" variants.

Many different types of variants may be present between two different alleles. Single nucleotide polymorphism (SNP) variants exist when two genes have different nucleotide bases at a particular location on the gene. Insertions or deletions (INDELs) exist between two genes when one gene contains a nucleotide sequence, while another gene contains a portion of that nucleotide sequence (with one or more nucleotide bases removed) and/or contains additional nucleotide bases (insertions). Structural differences can exist between two genes as well, such as duplications, inversions, and copy-number variations (CNVs).

Depending on the sensitivity and implementation of a variant caller, read data from a whole genome may include millions of potential variants. Some of these potential variants may be true variants (such as those described above), while others may be false positive detections.

III. Example Polynucleotide Barcode Insertion and Sequencing

It is desirable in a variety of applications to unambiguously determine a sequence for DNA, RNA, or some other target polynucleotide in a sample. However, limitations in the cost and capability of current sequencing technologies, as well as the properties of target polynucleotides of interest and of the samples that contain the target polynucleotides, often result in fragmented or ambiguous reads from which it is difficult to determine the 'true' sequence of the target polynucleotide. The systems and methods provided herein improve the process of sequencing by introducing polynucleotide barcodes into a target polynucleotide prior to sequencing. The presence of the inserted barcodes can then be leveraged to improve fragment alignment, variant detection, or other aspects of sequencing, resulting in lowered ambiguity or otherwise improved sequencing of a target polynucleotide and/or of sets of target polynucleotides in a sample.

These difficulties could be related to the loss of 'distal information' about the relative location of sequenced fragments within a target polynucleotide. This loss of information may be compensated for in a variety of ways, e.g., through inference based on overlaps or other relationships between different sequence fragments and/or between the sequence fragments and a known good reference sequence. However, even with the benefit of such circumstances, it can be impossible to unambiguously determine the sequence of a target polynucleotide.

For example, if the target polynucleotide includes a repeat-containing region (e.g., a region that includes an unknown number of trinucleotide repeats, tandem repeats, or other repeated sub-sequences) and at least one single sequence fragment of the available fragments does not fully span the repeat region, it can be impossible to wholly unambiguously determine the number of repeats that are present in the repeated region. Determining the repeat number/length of a repeated region of a target polynucleotide can be especially relevant in practical applications of sequencing, e.g., in diagnosing and/or investigating trinucleotide repeat disorders or other phenomena related to the presence, length, or other properties of repeat-containing regions of a target polynucleotide.

This ambiguity is illustrated by way of example in FIG. 1A, which shows first 100a and second 100b fragment polynucleotide sequences that have been read from a sample and that include a repeated sequence 105 (in this example, a trinucleotide repeat, though other types of tandem repeats or other repeated structures are possible). The identities of the bases in the sequences 100a, 100b are represented by the fill texture of the squares in the sequence, with each square representing a respective nucleobase of the polynucleotide sequence. So, where the target polynucleotide is DNA, the different textures could represent adenine, thymine, guanine, and cytosine. Where the target polynucleotide is RNA, the different textures could represent adenine, uracil, guanine, and cytosine. Where the target polynucleotide is some other variety of polynucleotide (e.g., an artificial polynucleotide composed of artificial and/or natural nucleobases, a hybrid DNA/RNA polynucleotide), the different textures could represent the various nucleobases present in the target polynucleotide.

The corresponding ends of the first 100a and second 100b sequence fragments each terminate with a number of instances of the repeated sequence 105. Accordingly, absent additional information about the relative location of the fragments 100a, 100b along the underlying target polynucleotide (e.g., an additional sequence fragment that fully spans the repeat-containing region), there is insufficient information to unambiguously determine the sequence of the target polynucleotide. For example, FIG. 1B shows a first possible target polynucleotide sequence 100c having a repeat-containing region 107 that includes three instances of the repeated sequence 105. This is the shortest possible length of the repeated region of the underlying true target polynucleotide sequence, based on the information present in the first 100a and second 100b sequence fragments. The repeated region could be longer, e.g., could contain 9 or more instances of the repeated sequence 105, as shown in the repeat-containing region 109 of the second possible target polynucleotide sequence 100d shown in FIG. 1C.

The repeat number/length ambiguity illustrated in FIGS. 1A-C is only one relevant ambiguity that may result from sequencing a sample using current sequencing methods and that may be fully or partially alleviated by application of the systems and methods disclosed herein. For example, difficulties in sequencing a target polynucleotide within a sample could be related to the presence of many different polynucleotides in the sample. In such examples, it can be difficult not just to align the various fragment read sequences but also to group them together correctly. Thus, it can be difficult to determine, e.g., whether an individual is heterozygous at a particular location, or if, instead, an observed single-nucleotide polymorphism (SNP) or other variant in a particular fragment read sequence represents an error in the sequencing process. This issue can be exacerbated by the lack of a good reference genome and/or the lack of robust statistical information about variants or other sequence information for a particular gene, chromosome, or other locus within a target polynucleotide. In another example, the multiple different polynucleotides in the sample could include multiple different isoforms of a particular RNA. In such examples, it can be difficult to unambiguously determine the sequences of all of the different isoforms of the RNA in the sample due to, e.g., difficulty with associating fragment read sequences with the correct isoform, difficulty assessing whether an observed variant represents a true variant in one of the isoforms or an error in the sequencing process, or due to other factors.

The systems and methods described herein address these and other issues in sequencing by, among other things, inserting a number of 'barcode' polynucleotide sequences into the target polynucleotide prior to sequencing fragments of the target polynucleotide. The barcode sequences can then be used to determine the sequence of one or more target polynucleotides in an improved manner. Such a process may include using barcode sequences that are present in fragment read sequences to identify the fragment read sequences as belonging to the same target polynucleotide (e.g., the same one of a pair of chromosomes, the same isoform of multiple isoforms of RNA transcoded from the same gene), to align the fragment read sequences (e.g., to align them in a manner that obviates ambiguities regarding the presence of an indel, a number of repeat sequences, or some other ambiguity that would be present in the absence of the barcode sequences), and/or to facilitate and/or improve some other aspect of sequencing. Alternatively, existing alignment or other sequencing algorithms could be applied (with appropriate modification) to align fragment read sequences from a sample that has had such barcodes inserted. The benefit in such an example is that the presence of the barcodes may break up repeated sequences or otherwise add an amount of 'randomness' that can improve alignment or other sequence-generation processes, with the barcodes later being removed from the generated sequences.

FIG. 2A-E illustrate and example process that includes the insertion of polynucleotide barcodes into a target polynucleotide in order to generate a sequence for the target polynucleotide. FIG. 2A illustrates the target polynucleotide 200. The target polynucleotide 200 could be composed of DNA, RNA, some other natural or artificial nucleobases and/or some combination thereof. For example, the target polynucleotide 200 could be a cDNA generated from an RNA of interest. The target polynucleotide 200 could be the entirety of a chromosome (e.g., a particular chromosome of a pair of chromosomes), mRNA (e.g., a particular isoform of mRNA transcribed from a particular locus or gene), or other naturally-terminated polynucleotide or could be a specified portion thereof, e.g., a specified gene, set of genes, allele, or other specified locus within a larger polynucleotide.

The target polynucleotide 200 could be isolated and/or purified such that it is the only polynucleotide present in a sample. Alternatively, the target polynucleotide 200 could be one of a plurality of different polynucleotides (e.g., other chromosome or fragments thereof, other isoforms of RNA corresponding to the same locus or gene) present in a sample. The target polynucleotide 200 could be amplified (e.g., via a process of polymerase chain reaction (PCR) or some other amplification process), fragmented (e.g., by the application of restriction enzymes), ligated, and/or processed in some other manner.

Figure 2B:
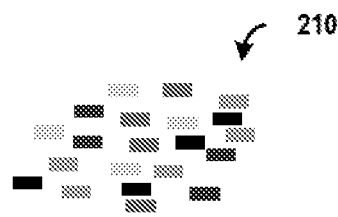
FIG. 2B illustrates aspects of an example method for improving polynucleotide sequencing by insertion of additional known sequences into a target polynucleotide.

FIG. 2B illustrates a set of polynucleotide barcodes 210 that can be inserted into the target polynucleotide 200. The polynucleotide barcodes 210 could have specified lengths in order to facilitate detection of the barcodes in read sequences of fragments of the target polynucleotide 200. The polynucleotide barcodes 210 could include a library of different barcodes. In some examples, the polynucleotide barcodes 210 could have sequences that are not present anywhere in the target polynucleotide 200 (e.g., that do not match any sub-sequence within a reference genome for the target polynucleotide 200) in order to facilitate detection of the barcodes in read sequences of fragments of the target polynucleotide 200. The set of polynucleotide barcodes 210 could include multiple copies of individual barcode sequences in order to reduce cost. In such examples, correspondences between occurrences of a particular barcode sequence in different fragment read sequences could be determined by comparing the read sequences surrounding the particular barcode sequence. If the read sequences surrounding the particular barcode sequence in two different fragment read sequences do not match, it is unlikely that they represent the same instance of the inserted polynucleotide barcode.

The set of polynucleotide barcodes 210 can be inserted into the target polynucleotide 200. This could be done by introducing probes containing the polynucleotide barcodes 210 into a sample that contains the target polynucleotide 200 and/or fragments or copies thereof. Such probes can include an insertion vector (e.g., CRISPR-Cas9, Tn5 transposase) to insert the probe's particular polynucleotide barcode into the target polynucleotide 200. The probes could include other elements or features. In some examples, the probes could be configured to insert the barcodes into specified locations of the target polynucleotide 200 (e.g., to facilitate sequencing of a specific locus within the target polynucleotide 200, to increase the likelihood that the barcode is inserted into a repeating region or other region prone to false variant calls or other ambiguous sequencing phenomena). In some examples, the probes could insert a payload polynucleotide that includes the polynucleotide barcode and some additional polynucleotide sequences, e.g., forward and/or reverse primer sequences, one or more additional barcodes, an endcap polynucleotide sequence that facilitates insertion of the remainder of the payload polynucleotide into the target polynucleotide 200 by the insertion vector, etc.

Figure 2C:
FIG. 2C illustrates aspects of an example method for improving polynucleotide sequencing by insertion of additional known sequences into a target polynucleotide.

FIG. 2C illustrates a post-insertion polynucleotide 220 that is the target polynucleotide 200 with a plurality of the polynucleotide barcodes 210 inserted therein. As shown, the post-insertion polynucleotide 220 has a single instance of each unique polynucleotide barcode inserted therein. In practice, however, a single target polynucleotide is likely to have multiple copies of each barcode in a set of polynucleotide barcodes inserted therein. Further, in some examples multiple copies, fragments, and/or copies of fragments of the target polynucleotide 200 may be present in a sample, in which case each of the copies, fragments, and/or copies of fragments is likely to have a respective different pattern of polynucleotide barcodes inserted therein. Insertion of polynucleotide barcodes into multiple copies, fragments, and/or copies of fragments of a target polynucleotide can have the benefit of allowing a greater proportion of the target polynucleotide to be unambiguously sequenced at lower rates of barcode insertion.

Figure 2D:
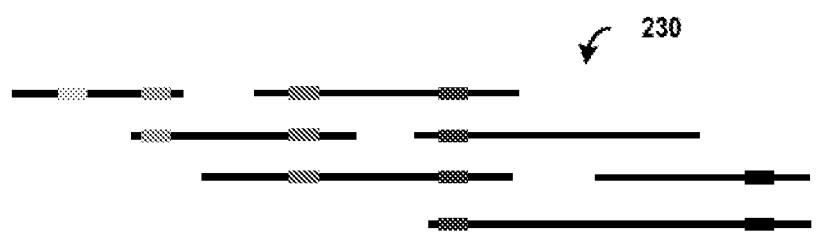
FIG. 2D illustrates aspects of an example method for improving polynucleotide sequencing by insertion of additional known sequences into a target polynucleotide.
Figure 2E:
FIG. 2E illustrates aspects of an example method for improving polynucleotide sequencing by insertion of additional known sequences into a target polynucleotide.

The post-insertion polynucleotide 220 can then be sequenced to generate a plurality of reads of the target polynucleotide 200 in the form of a plurality of reads 230 of the post-insertion polynucleotide 220, as illustrated in FIG. 2D. This could include applying a variety of next-generation sequencing techniques or other methods to generate reads of portions of the post-insertion polynucleotide 220. The sequencing process could include, subsequent to inserting the barcodes, amplifying the post-insertion polynucleotide 220, fragmenting the post-insertion polynucleotide 220, amplifying the fragments of the post-insertion polynucleotide 220 subsequent to such fragmentation, or applying some other processes to sequence the post-insertion polynucleotide 220. Sequencing the post-insertion polynucleotide 220 to generate the plurality of reads 230 could include fragmenting the post-insertion polynucleotide 220 and then sequencing the fragments. Additionally or alternatively, reads could be begun from specified locations (e.g., primer sequences) on the post-insertion polynucleotide 220 and/or on fragments thereof. In some examples, such primers could be inserted along with the barcodes, e.g., to ensure that each of the reads 230 begins with a barcode sequence.

As shown in FIG. 2D, each read of the plurality of reads 230 includes at least one barcode. Further, the particular pattern of presence of barcodes represented in the plurality of reads 230 means that the plurality of reads 230 can be stitched together based on the barcodes, without ambiguity regarding the ordering or degree of overlap of the reads. The output of such an alignment process is the preliminary sequence 240 shown in FIG. 2E. The sequence for the target polynucleotide 200 can then be recovered by removing the barcode sequences from the preliminary sequence 240.

The insertion of polynucleotide barcodes into a target polynucleotide can facilitate unambiguous recovery of the sequence of the target polynucleotide in a variety of ways, even in the face of sequence repeats, indels, or other features in the target polynucleotide. In a first example, FIG. 3 illustrates portions of first 310a and second 320a read fragments. A first polynucleotide barcode 300a is present in the first 310a and second 320a read fragments and a second polynucleotide barcode 300b is present in the second read fragment 320a. The target polynucleotide, into which the barcodes 300a, 300b were inserted and from which the read fragments 310a, 320a were read, includes a number of repeats of a repeat sequence 305 (a trinucleotide repeat, though tandem repeats or other repeated sequence structures are possible). The first polynucleotide barcode 300a was inserted within the repeat region between instances of the repeat sequence 305. Accordingly, it is possible to unambiguously determine the number of instances of the repeat sequence 305, which would not have been possible had the barcodes 300a, 300b not been inserted (compare, e.g., with the scenario presented in combination with FIGS. 1A-C). In another example, an indel could be present (or absent) between barcode sequences inserted into a target polynucleotide, and the inserted barcodes could facilitate unambiguously determining the presence (or absence) of the indel at that location in the in the target polynucleotide.

Properties of the sequencing process (e.g., properties relating to a mean length of the read fragments) and/or the barcode insertion process (e.g., properties to increase a density of insertion of the barcodes) could be specified to increase the likelihood that all of, or significant contiguous portions of, a target polynucleotide 200 can be unambiguously sequenced in this manner. However, in practice it is likely that there will be portions of the target polynucleotide that are not represented by read fragments containing barcodes sufficient to completely unambiguously recover the underlying sequence of the target polynucleotide. For example, a particular portion of the target polynucleotide may not be represented by a read fragment that also includes barcodes on either side of the particular portion (with those barcodes also being represented in other read fragments, etc.), or may not be represented in any read fragments at all. In such cases, conventional methods for read alignment (between different read fragments, or between a read fragment and a reference genome) could be applied to recover a sequence for the particular portion of the target polynucleotide.

In order to increase the likelihood that the entirety of a target polynucleotide sequence can be unambiguously sequenced, the target polynucleotide could be amplified prior to barcode insertion. The multiple different copies of the target polynucleotide will thus have inserted therein different sets of barcodes at different locations within the target polynucleotide. Accordingly, different long contiguous segments of the different copies may be unambiguously recoverable. These long, contiguous sequences can then be aligned with each other to generate a higher-quality, more accurate sequence for the underlying target polynucleotide.

The polynucleotide barcodes could be specified and/or fabricated in a variety of ways. The barcodes could have lengths to facilitate detection of the barcodes in read fragments (and thereby to permit use of the detected barcodes to generate sequences for a target polynucleotide). For example, the polynucleotide barcodes could be dozen(s) or hundred(s) of nucleotides long. A variety of methods could be employed to detect and identify barcode in read fragments such that multiple copies of a single polynucleotide barcode may be inserted into a single target polynucleotide.

This could include identifying an instance of a particular polynucleotide barcode in multiple different read fragments and then using the neighborhood of the identified barcodes to determine correspondences between the read fragments. FIG. 4A illustrates example first 410a, second 420a, and third 420c read fragments in which are located copies of a polynucleotide barcode 400. The location of the polynucleotide barcode 400 within each of the read fragments 410a, 420a, 430a could be determined (e.g., by a process of pattern matching). The nucleotides in the neighborhood of each of the copies of the barcode 400 could then be used to identify whether each of the identified copies of the barcode 400 correspond to the same inserted instance of the polynucleotide barcode 400 and thus should be aligned.

Such a process would result, in the example illustrated in FIG. 4A, with the association of the first 410a and second 420a read fragments, but not the third read fragment 430a, as the neighborhoods of the first 410a and second 420a read fragments around the barcode 400 match each other, but do not match the neighborhood of the third read fragment 430a around the barcode 400.

As noted above, detection of a barcode sequence within a read fragment and/or within a preliminary sequence (e.g., 240) in order to remove the inserted barcode sequence could include using pattern matching or other techniques to detect the presence of sequences within the read fragment or preliminary sequence that match the sequence of the barcode. Where a reference genome is available for all or part of the target polynucleotide, the read fragment and/or preliminary sequence can be compared to the reference genome in order to detect the presence of the barcode sequence. This is illustrated by FIG. 4B, which shows a read fragment 420b into which has been inserted a polynucleotide barcode 400. Also shown is a portion of a reference genome 410b that corresponds to the read fragment 420b. The read fragment 420b could be compared to the reference genome 410b in order to detect the polynucleotide barcode 400 in the read fragment 420b by detecting the presence of the sequence of the polynucleotide barcode 400 in the read fragment 420b and/or by detecting the presence of an insertion, in the read fragment 420b, of a sequence (the barcode) into the sequence of the reference genome 410b. Such a process could be performed as an alternative to pattern-matching or other methods to detect barcode sequences in read fragment and/or to augment such processes.

The particular nucleotide sequences represented by individual polynucleotide barcodes in a library of such barcodes could be randomly selected, e.g., created as a result of random generation of oligonucleotides. Alternatively, the sequences of the barcodes could be selected to enhance some aspect of their use to sequence target polynucleotides, as described herein. For example, where a reference genome is available for the target polynucleotide, the sequences of the polynucleotide barcodes could be selected to be sequences that do not occur and/or that are unlikely to occur despite a threshold level of replication errors relative to the reference genome. Once the sequences of the barcodes are determined, corresponding polynucleotide barcodes could be generated using, e.g., available methods of synthesizing oligonucleotides with specified sequences.

The barcodes, once generated, could be amplified, conjugated to insertion vectors or otherwise incorporated into probes, or otherwise processed to provide a library of polynucleotide barcodes that can be inserted into target polynucleotides to facilities sequencing of the target polynucleotides. In some examples, the polynucleotide barcodes could, themselves, be sequenced in order to determine and/or confirm the sequences of the polynucleotide barcodes (e.g., in examples wherein the polynucleotide barcodes were generated by a random or semi-random synthesis process).

As noted above, polynucleotide barcodes can be inserted into a target polynucleotide after performing amplification, fragmentation, or some other processes on the target polynucleotide. In some examples, the polynucleotide barcodes could be inserted into the target polynucleotide, fragments of the target polynucleotide, and/or the target polynucleotide or fragments thereof multiple times, interspersed with, e.g., additional amplification, fragmentation, and/or other sample preparation processes. Such a process could be performed, e.g., to further enrich the 'randomness' in the read fragments that is introduced by the insertion of the polynucleotide barcodes, further improving the quality and/or accuracy of sequences determined therefrom for a target polynucleotide. The contents of a sample could be sequenced at a number of different points in such a repeated-insertion process. For example, a plurality of polynucleotide barcodes could be inserted into a target polynucleotide and a plurality of read fragments sequenced therefrom (e.g., following amplification). A further plurality of polynucleotide barcodes could then be inserted into the target polynucleotide (and/or copies, fragments, and/or copies of fragments thereof) and a plurality of additional read fragments sequenced from this doubly-inserted sample.

IV. Example Probes

The systems and methods described herein include inserting polynucleotide barcodes into a target polynucleotide in order to facilitate and/or improve sequencing the target polynucleotide and/or selected portions thereof. A variety of methods can be employed to insert a set of polynucleotide barcodes into a target polynucleotide. In some examples, this can include creating a plurality of probes, each probe including an insertion vector and a payload polynucleotide (which includes the polynucleotide barcode). The insertion vector is a structure (e.g., a protein, DNA, RNA, and/or other substances or structures) configured to insert the payload polynucleotide into another polynucleotide, e.g., into the target polynucleotide.

The insertion vector could include CRISPR-Cas9, CRISPR-Cas12a, CRISPR associated with some other protein or complex of proteins, Tn5 transposase, Tn7 transposase, some other transposase, or some other insertion vector that can act to insert a barcode-containing payload polynucleotide into a target polynucleotide. The insertion vector could insert the payload polynucleotide at random locations within the target polynucleotide and/or at specified locations within the target polynucleotide (e.g., at specified locations within the target polynucleotide that complement a guide RNA (gRNA) of the insertion vector). If the insertion vector is configured to insert the payload at a specified location(s), the location(s) could be specified to target locations of particular interest within the target polynucleotide, e.g., locations proximate SNPs, trinucleotide repeats, indels, or other variants of relevance to a particular disease or disorder.

The payload polynucleotide of a probe includes at least one polynucleotide barcode, but may include additional elements. For example, the payload polynucleotide could include forward and/or reverse primer sequences. This could be done to facilitate the generation of read fragments that include at least one polynucleotide barcode by providing primer sequences that initiate amplification of the barcode-inserted target polynucleotide at locations proximate to the barcode of the payload polynucleotide. Additionally or alternatively, the payload polynucleotide could include restriction site sequences or other sequences to facilitate targeted cutting of the polynucleotide following insertion of the payload polynucleotide. These payload contents could be included to facilitate the generation of read fragments that include at least one polynucleotide barcode near an end of the fragment by facilitating fragmentation of the target polynucleotide proximate to the barcode of the payload polynucleotide, e.g., to facilitate the generation of read fragments that begin and end with inserted polynucleotide barcodes or that otherwise include inserted polynucleotide barcodes proximate to both ends of the read fragments. In some examples, the payload polynucleotide may include sequences to facilitate associating with and/or insertion by an insertion vector. Depending on the particulars of the insertion vector, such sequences may or may not be inserted into the target polynucleotide. The payload polynucleotide could include multiple polynucleotide barcodes, e.g., to facilitate multiplexing of the barcodes or to provide some other benefit. In examples where the payload polynucleotide includes sequences in addition to an explicit "barcode" sequence (e.g., primer sequences, restriction site or other cut-targeting sequences), such additional sequences may be considered part of the barcode and/or may be identified along with the barcode sequence in order to detect the presence of the barcode sequence in read fragments. In some examples, the payload may include 'gap sequences' flanking any of the above features (e.g., disposed between forward and reverse primer sequences) to provide targeted cut sites (e.g., for restriction enzymes), non-critical bases to permit variability in the extent or location of polynucleotide cutting/insertion/etc., or to provide some other benefit.

V. Example Dual-Linked Probes and Related Methods

As described above, the insertion of polynucleotide barcodes into a target polynucleotide can provide a variety of benefits with respect to determining a sequence of the target polynucleotide. These methods can be expanded by inserting additional content into the target polynucleotide in addition to a single barcode sequence. For example, forward and/or reverse primer sequences could be inserted such that all (or an increased amount) of the read fragments generated from a barcode-inserted target polynucleotide begin with a barcode sequence. This could be done to provide a number of benefits, for example, in order to increase the likelihood that the read fragments include two or more inserted barcode sequences, to permit targeting of amplicons of interest that are proximate to the outermost of such inserted primer sequences, and/or in order to facilitate unambiguous sequencing of portions of the target polynucleotide. Additionally or alternatively, the insertion of primers along with polynucleotide barcodes can allow for repeated insertion of polynucleotide barcodes into a target polynucleotide without fragmentation, even when using samples that contain very few copies of the target polynucleotide. This could have the benefit of permitting multiplexing of reads or otherwise improving the sequencing process and/or the accuracy/quality of sequence data generated therefrom.

In a particular example, forward and reverse primer sequences can be inserted along with one or more associated barcode sequences. Subsequently, the forward and reverse primer sequences can be used to amplify and read fragments of the target polynucleotide that begin with the inserted barcode(s), such that the association between two different inserted barcodes, or between an inserted barcode and its reverse, at the beginning of two different read fragments can be used to align the ends of the two different read fragments.

Figure 5A:
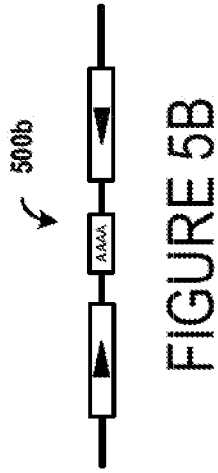
FIG. 5A illustrates an example of a polynucleotide that can be inserted into a target polynucleotide.

An example of such a "dual-linked" polynucleotide barcode payload sequence 500a that can be inserted into a target polynucleotide is illustrated in FIG. 5A. The payload sequence 500a includes a first barcode ("AAAA") and a second barcode ("BBBB"). The first and second barcodes could be the same or different sequences (e.g., one sequence the reverse of the other). The payload sequence 500a also includes a forward primer sequence (indicated for the right-facing arrow) and a reverse primer sequence (indicated by the left-facing arrow). The forward and reverse primer sequences, when inserted into a target polynucleotide, can cause transcriptases or other substances to begin copying the payload-inserted target polynucleotide at the forward or reverse primer sequences, respectively, in the forward or reverse directions along the target polynucleotide, respectively. Accordingly, copied fragments of the target polynucleotide started from the forward or reverse primer sequences will begin with the second ("BBBB") or first ("AAAA") barcode sequences, respectively. These barcode sequences can be detected in the copied fragments if they are sequenced. Responsive to such a detection, the correspondence between the forward second barcode and the reversed first barcode can be determined and used to align the sequences of the copied fragments together.

Figure 5B:
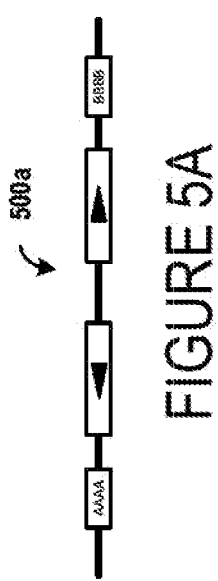
FIG. 5B illustrates an example of a polynucleotide that can be inserted into a target polynucleotide.

Alternatively, the primer sequences could be directed toward each other, allowing a single barcode sequence to be used (which will be sequenced in reverse on fragments copied from the reverse primer). An example of such a polynucleotide barcode payload sequence 500b that can be inserted into a target polynucleotide is illustrated in FIG. 5B. The payload sequence 500b includes a barcode ("AAAA") flanked by a forward primer sequence (indicated for the right-facing arrow) and a reverse primer sequence (indicated by the left-facing arrow). The forward and reverse primer sequences, when inserted into a target polynucleotide, can cause transcriptases or other substances to begin copying the payload-inserted target polynucleotide at the forward or reverse primer sequences, respectively, in the forward or reverse directions along the target polynucleotide, respectively. Accordingly, copied fragments of the target polynucleotide started from the forward or reverse primer sequences will begin with the barcode sequence or the reversed barcode sequence, respectively. Repeated size selection of the copied fragments could be used to reject copied fragments that consist only of the barcode and minimal flanking sequences. The barcode sequences can then be detected in the copied fragments if they are sequenced. Responsive to such a detection, the correspondence between the barcode and its reversed sequence can be determined and used to align the sequences of the copied fragments together.

Figure 6:
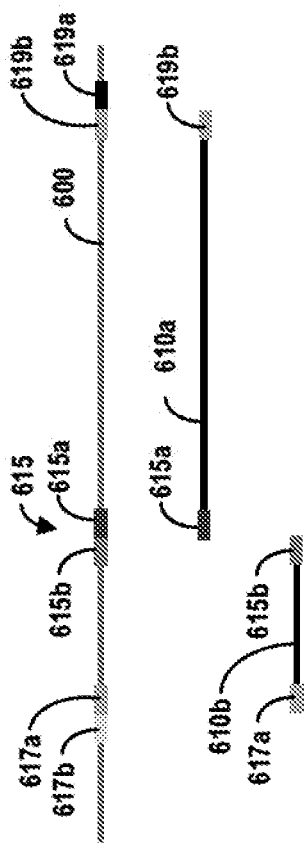
FIG. 6 illustrates an example of polynucleotides that have been inserted into a target polynucleotide and example read sequences generated therefrom.
Figure 7:
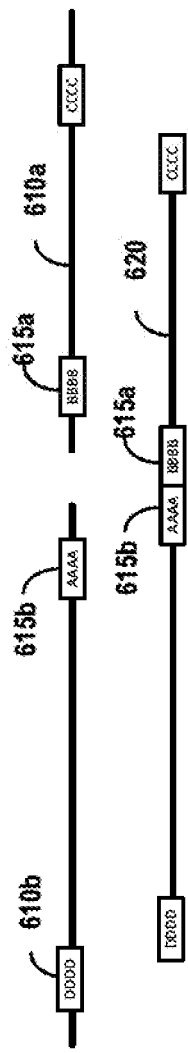
FIG. 7 illustrates an example alignment of two sequences.

FIG. 6 illustrates the generation and alignment of such fragments. A target polynucleotide 600 has had inserted therein a number of dual-linked polynucleotide barcodes (indicated by the two-toned sub-sequences along the length of the target polynucleotide 600), including a first particular dual-linked polynucleotide barcode 615 that includes a first barcode 615a and a second barcode 615b. The inserted dual-linked polynucleotide barcodes additionally include a second particular dual-linked polynucleotide barcode 617 that includes a third barcode 617a and a fourth barcode 617b and a third particular dual-linked polynucleotide barcode 619 that includes a fifth barcode 619a and a sixth barcode 619b. A first read fragment 610a is generated by transcribing the target polynucleotide 600 from a forward primer sequence of the first particular dual-linked polynucleotide barcode 615, from a reverse primer sequence of the third particular dual-linked polynucleotide barcode 619, and/or by fragmenting the target polynucleotide 600 between the barcodes 615a, 615b and 619a, 619b of the first 615 and third 619 particular dual-linked polynucleotide barcodes, respectively and transcribing the fragment and then sequencing the transcribed polynucleotide. Such sequencing could include paired-end sequencing of the fragment, amplifying the fragment and sequencing amplified copies of the fragment from the first and/or second ends of the fragment, or using some other sequencing technique. Thus, the first barcode 615a is proximate to an end of the first read fragment 610a and the sixth barcode 619b is proximate to an opposite end of the first read fragment 610a. A second read fragment 610b is generated by transcribing the target polynucleotide 600 from a reverse primer sequence of the first particular dual-linked polynucleotide barcode 615, from a reverse primer sequence of the second particular dual-linked polynucleotide barcode 617, and/or by fragmenting the target polynucleotide 600 between the barcodes 615a, 615b and 617a, 617b of the first 615 and second 617 particular dual-linked polynucleotide barcodes, respectively and transcribing the fragment and then sequencing the transcribed polynucleotide. Thus, the second barcode 615b is proximate to an end of the second read fragment 610b and the third barcode 617a is proximate to an opposite end of the second read fragment 610b. The correspondences between the first 615a and second 615b barcodes can be determined and used to align (or 'stitch together') the first 610a and second 610b read fragments, as shown in FIG. 7 by the stitched-together sequence 620.

Note that this is only a single example of a scenario wherein insertion of such dual-linked barcodes into a target polynucleotide can result in lower-cost, faster, more accurate, or otherwise improved sequencing of the target polynucleotide. In practice, amplicons are likely to begin and/or end with one barcode of a pair and less likely to extend so far as to extend across and beyond a neighboring barcode insertion (especially in instances where restriction enzymes or other means have been employed to fragment the target polynucleotide between the paired barcodes of each of the inserted dual-linked polynucleotide barcodes), increasing the information about linkages between different reads that is represented in each read, or in a set of reads (the portion of a read fragment sequence that extends through and beyond a dual-linked barcode insertion is unlikely to contain any additional information when compared to another fragment read sequence that begins from one of the barcodes of the dual-linked barcode insertion). Additionally, the additional of restriction sequences or other cut-targeting sequences in the dual-linked barcode payloads between the barcodes allows the target polynucleotide (or a copy thereof) to be cut into similarly-sized fragments, resulting in more uniform amplification of a target polynucleotide, especially in circumstances where there the amount available of the input target polynucleotide is low.

This stitching process can be performed a number of times based on detected linked polynucleotide barcodes in additional read fragments to generate stitched-together sequences that span all or significant contiguous portions of the target polynucleotide 600. The barcodes and associated inserted polynucleotide sequences (e.g., restriction site sequences, primer sequences, sequences connecting together other sequences, portions of sequences used by an insertion vector to insert barcodes and other sequences, mosaic end sequences used as sacrificial sequences to ensure that an insertion vector inserts all of a barcode or other payload sequence into the target polynucleotide) can then be removed to provide a sequence for the target polynucleotide prior to insertion of the barcodes.

A benefit of inserting primer sequences along with barcode sequences is that the primer sequences can direct transcription and amplification of fragments of the barcode-inserted target polynucleotide without ligating or otherwise fragmenting the target polynucleotide. Accordingly, polynucleotide barcodes can be inserted into the target polynucleotide in several rounds, generating read fragments of the target polynucleotide after each insertion. This can provide richer read fragment data, improving the quality and/or accuracy of the resulting sequence.

Payload polynucleotide sequences as described herein (e.g., that include one or more barcode sequences, primer sequences, restriction site sequences, and/or some other sequences) could be generated in a variety of ways. In some examples, the sequence of a payload polynucleotide could be fully specified and then the payload polynucleotide generated by a process of oligonucleotide synthesis. However, such a practice may be prohibitively expensive. Accordingly, a variety of alternative methods may be employed to generate a library of dual-linked barcode payload polynucleotide sequences. For example, existing barcode sequences and primer sequences could be ligated together to form a payload polynucleotide. The existing barcode polynucleotides could be generated via directed or random oligonucleotide synthesis. Where some aspect of randomness is used to generate the payload polynucleotides, the payload polynucleotides could be sequenced following synthesis in order to determine the associations between barcodes of individual payload polynucleotides.

Additionally or alternatively, the complement to a polynucleotide containing a single barcode and primer sequence could be grown on the polynucleotide in order to generate its complement. A hairpin could then be added, allowing the complementary strands of the polynucleotide to be denatured apart to provide a dual-linked barcode polynucleotide that includes a forward primer, a reverse primer, and two barcodes that are reversed complements of each other.

Figure 8A:
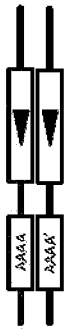
FIG. 8A illustrates aspects of an example process for developing a library of dual-linked insertion sequences.
Figure 8B:
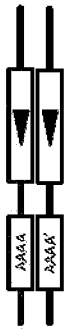
FIG. 8B illustrates aspects of an example process for developing a library of dual-linked insertion sequences.
Figure 8C:
FIG. 8C illustrates aspects of an example process for developing a library of dual-linked insertion sequences.
Figure 8D:
FIG. 8D illustrates aspects of an example process for developing a library of dual-linked insertion sequences.

Such a process is illustrated in Figures 8A-D. Figure 8A shows a template polynucleotide that includes a first barcode polynucleotide ("AAAA") and a primer sequence (the left-facing arrow). FIG. 8B shows the formation of a complementary polynucleotide onto the template polynucleotide (e.g., via polymerase chain reaction). The complementary polynucleotide thus includes a second barcode polynucleotide ("AAAA") that is complementary to the first barcode polynucleotide and a second primer sequence. FIG. 8C shows a hairpin 800 having been added to connect the template polynucleotide to the complementary polynucleotide. FIG. 8D shows the dual-linked barcode polynucleotide following denaturation to separate the plate polynucleotide and the complementary polynucleotide. Thus, the dual-linked barcode polynucleotide includes a first barcode polynucleotide and a second barcode polynucleotide that is a reversed, complementary version of the first barcode polynucleotide.

VI. Example Methods

Figure 9:
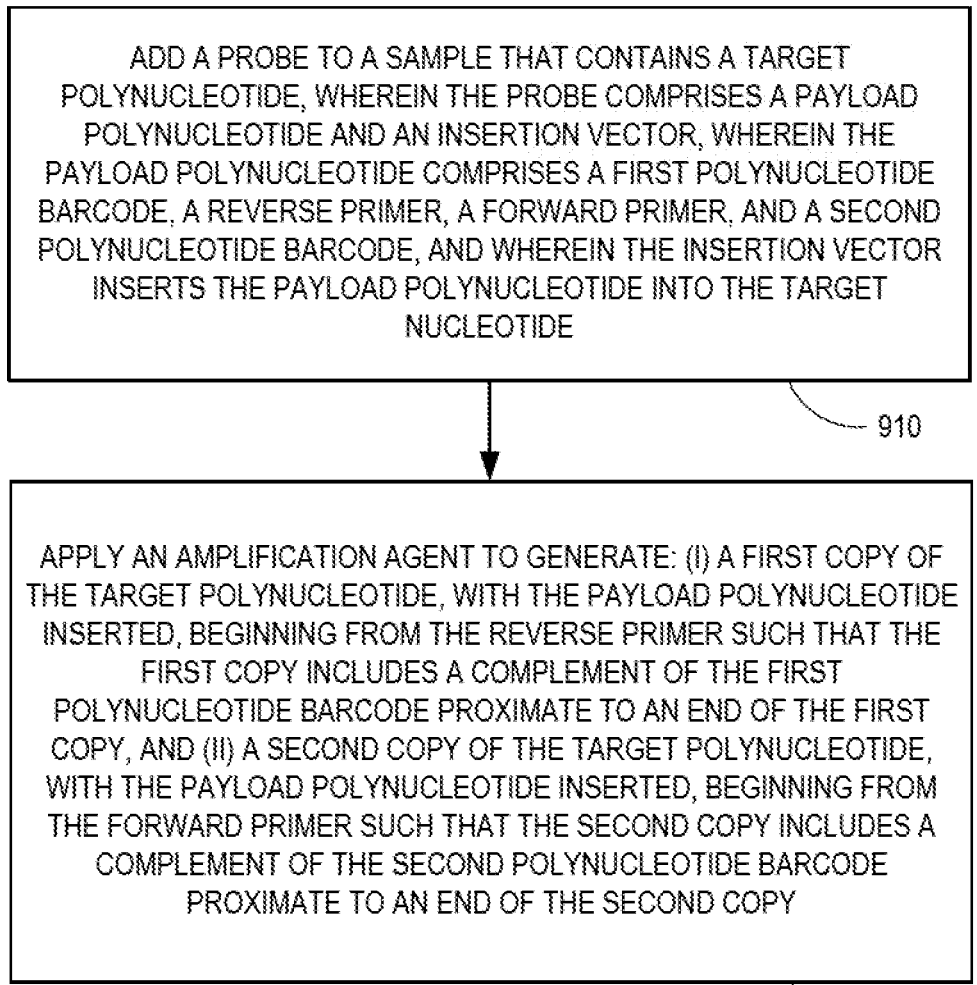
FIG. 9 illustrates a flowchart of an example method.

FIG. 9 depicts an example method 900. The method 900 includes adding a probe to a sample that contains a target polynucleotide, wherein the probe comprises a payload polynucleotide and an insertion vector, wherein the payload polynucleotide comprises a first polynucleotide barcode, a reverse primer, a forward primer, and a second polynucleotide barcode, and wherein the insertion vector inserts the payload polynucleotide into the target poly nucleotide (910). The method 900 additionally includes applying an amplification agent to generate: (i) a first copy of the target polynucleotide, with the payload polynucleotide inserted, beginning from the reverse primer such that the first copy includes a complement of the first polynucleotide barcode proximate to an end of the first copy, and (ii) a second copy of the target polynucleotide, with the payload polynucleotide inserted, beginning from the forward primer such that the second copy includes a complement of the second polynucleotide barcode proximate to an end of the second copy (920). The method 900 could include additional steps or features.

Figure 10:
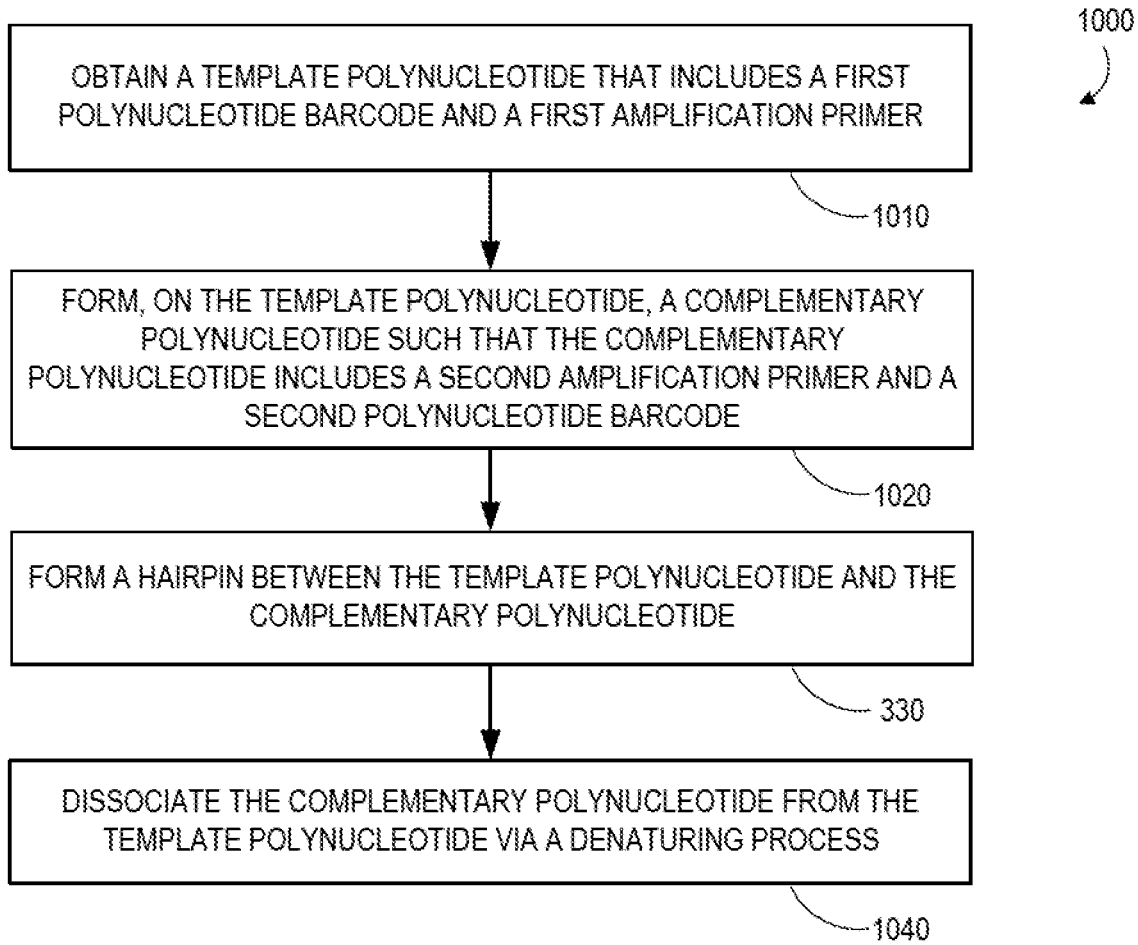
FIG. 10 illustrates a flowchart of an example method.

FIG. 10 depicts an example method 1000 for generating a payload polynucleotide. The method 1000 includes obtaining a template polynucleotide that includes a first polynucleotide barcode and a first amplification primer (1010). The method 1000 additionally includes forming, on the template polynucleotide, a complementary polynucleotide such that the complementary polynucleotide includes a second amplification primer and a second polynucleotide barcode (1020). The method 1000 additionally includes forming a hairpin between the template polynucleotide and the complementary polynucleotide (1030). The method 1000 additionally includes dissociating the complementary polynucleotide from the template polynucleotide via a denaturing process (1040). The method 1000 may include additional steps or features.

FIG. 11 depicts an example method 1100. The method 1100 includes inserting, into a target polynucleotide that is contained within a sample, a plurality of polynucleotide barcodes, wherein the plurality of inserted polynucleotide barcodes includes a first polynucleotide barcode and a second polynucleotide barcode (1110). The method 1100 additionally includes, subsequent to inserting the plurality of polynucleotide barcodes into the target polynucleotide, sequencing at least a portion of the sample a plurality of times to obtain a plurality of reads of the target polynucleotide, wherein a first read of the plurality of reads includes the first polynucleotide barcode, and wherein a second read of the plurality of reads includes the first polynucleotide barcode and the second polynucleotide barcode (1120). The method 1100 additionally includes determining a sequence for the target polynucleotide based on the plurality of reads of the target polynucleotide (1130).

Determining the sequence for the target polynucleotide (1130) includes determining a preliminary sequence for the target polynucleotide, wherein determining the preliminary sequence comprises stitching together the first and second reads such that the first polynucleotide barcode in each of the first and second reads is overlapping (1132). Determining the sequence for the target polynucleotide (1130) additionally includes removing the sequence of the first and second polynucleotide barcodes from the preliminary sequence (1134).

The method 1100 may include additional steps or features.

It should be understood that arrangements described herein are for purposes of example only. As such, those skilled in the art will appreciate that other arrangements and other elements (e.g. machines, interfaces, operations, orders, and groupings of operations, etc.) can be used instead of or in addition to the illustrated elements or arrangements.

VII. Conclusion

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method, comprising:

adding a probe to a sample that contains a target polynucleotide, wherein the probe comprises a payload polynucleotide and an insertion vector, wherein the payload polynucleotide comprises a first polynucleotide barcode, a reverse primer, a forward primer, and a second polynucleotide barcode, and wherein the insertion vector inserts the payload polynucleotide into the target polynucleotide;

applying an amplification agent to generate: (i) a first copy of the target polynucleotide, with the payload polynucleotide inserted, beginning from the reverse primer such that the first copy includes a complement of the first polynucleotide barcode proximate to an end of the first copy, and (ii) a second copy of the target polynucleotide, with the payload polynucleotide inserted, beginning from the forward primer such that the second copy includes a complement of the second polynucleotide barcode proximate to an end of the second copy;

subsequent to adding the probe to the sample, sequencing at least a portion of the sample a plurality of times to obtain a read of the first copy of the target polynucleotide and a read of the second copy of the target polynucleotide;

subsequent to applying the amplification agent, inserting, into the target polynucleotide, an additional plurality of polynucleotide barcodes to obtain additional copies of the target polynucleotide with the additional plurality of polynucleotide barcodes inserted therein; and subsequent to inserting the additional plurality of polynucleotide barcodes into the target polynucleotide, sequencing at least a portion of the sample a plurality of times to obtain reads of the additional copies of the target polynucleotide, wherein determining the sequence for the target polynucleotide comprises determining the sequence based on the read of the first copy of the target polynucleotide, the read of the second copy of the target polynucleotide, and the reads of the additional copies of the target polynucleotide.

2. The method of claim 1, wherein the insertion vector comprises Tn5 transposase.

3. The method of claim 1, wherein the insertion vector comprises CRISPR-Cas9.

4. The method of claim 1,
wherein determining the sequence for the target polynucleotide comprises:
determining a preliminary sequence for the target polynucleotide based on the read of the first copy and the read of the second copy; and
removing the sequence of the first and second polynucleotide barcodes from the preliminary sequence.

5. The method of claim 4, wherein determining the preliminary sequence comprises stitching together the end of the first copy to the end of the second copy.

6. The method of claim 5, further comprising:
sequencing the probe to generate a probe sequence; and
based on the probe sequence, determining respective sequences for the first and second polynucleotide barcodes and determining that the first and second polynucleotide barcodes correspond to each other,
wherein stitching together the end of the first copy to the end of the second copy is performed responsive to determining that the first copy contains the determined sequence for the first polynucleotide barcode proximate to the end of the first copy and that the second copy contains the determined sequence for the second polynucleotide barcode proximate to the end of the second copy.

7. The method of claim 4, further comprising:
prior to adding the probe to the sample, sequencing at least a portion of the sample a plurality of times to obtain a plurality of unmodified reads of the target polynucleotide, wherein removing the first and second polynucleotide barcodes from the preliminary sequence comprises comparing the preliminary sequence to at least one read of the plurality of unmodified reads of the target polynucleotide.

8. The method of claim 1, wherein the target polynucleotide comprises DNA.

9. The method of claim 1, wherein the target polynucleotide comprises RNA, wherein the target polynucleotide is a first isoform of an RNA sequence, and wherein the sample contains a second isoform of the RNA sequence, and wherein the first isoform differs from the second isoform.

10. The method of claim 1, wherein the first and second polynucleotide barcodes have the same sequence.

11. The method of claim 1, wherein the second polynucleotide barcode is a reversed, complementary version of the first polynucleotide barcode.

12. A method for generating a payload polynucleotide, the method comprising:
obtaining a template polynucleotide that includes a first polynucleotide barcode and a first amplification primer;
forming, on the template polynucleotide, a complementary polynucleotide such that the complementary polynucleotide includes a second amplification primer and a second polynucleotide barcode;
forming a hairpin between the template polynucleotide and the complementary polynucleotide; and
dissociating the complementary polynucleotide from the template polynucleotide via a denaturing process.

13. A non-transitory computer readable medium having stored therein instructions executable by a computing device to cause the computing device to perform operations to determine a sequence for a target polynucleotide based on a read of a first copy of the target polynucleotide, a read of a second copy of the target polynucleotide, and reads of additional copies of the target polynucleotide, wherein the read of the first copy of the target polynucleotide, the read of the second copy of the target polynucleotide, and the reads of the additional copies of the target polynucleotide are obtained by:
adding a probe to a sample that contains the target polynucleotide, wherein the probe comprises a payload polynucleotide and an insertion vector, wherein the payload polynucleotide comprises a first polynucleotide barcode, a reverse primer, a forward primer, and a second polynucleotide barcode, and wherein the insertion vector inserts the payload polynucleotide into the target polynucleotide;
applying an amplification agent to generate: (i) the first copy of the target polynucleotide, with the payload polynucleotide inserted, beginning from the reverse primer such that the first copy includes a complement of the first polynucleotide barcode proximate to an end of the first copy, and (ii) the second copy of the target polynucleotide, with the payload polynucleotide inserted, beginning from the forward primer such that the second copy includes a complement of the second polynucleotide barcode proximate to an end of the second copy;

subsequent to adding the probe to the sample, sequencing at least a portion of the sample a plurality of times to obtain the read of the first copy of the target polynucleotide and the read of the second copy of the target polynucleotide;

subsequent to applying the amplification agent, inserting, into the target polynucleotide, an additional plurality of polynucleotide barcodes to obtain additional copies of the target polynucleotide with the additional plurality of polynucleotide barcodes inserted therein; and subsequent to inserting the additional plurality of polynucleotide barcodes into the target polynucleotide, sequencing at least a portion of the sample a plurality of times to obtain the reads of the additional copies of the target polynucleotide;

wherein determining the sequence for the target polynucleotide comprises:

determining a preliminary sequence for the target polynucleotide based on the read of the first copy and the read of the second copy; and removing the sequence of the first and second polynucleotide barcodes from the preliminary sequence.

14. The computer readable medium of claim 13, wherein determining the preliminary sequence comprises stitching together the end of the first copy to the end of the second copy.

15. The computer readable medium of claim 14, wherein the operations further comprise:

obtaining a probe sequence for the probe; and based on the probe sequence, determining respective sequences for the first and second polynucleotide barcodes and determining that the first and second polynucleotide barcodes correspond to each other, wherein stitching together the end of the first copy to the end of the second copy is performed responsive to determining that the first copy contains the determined sequence for the first polynucleotide barcode proximate to the end of the first copy and that the second copy contains the determined sequence for the second polynucleotide barcode proximate to the end of the second copy.

16. The non-transitory computer readable medium of claim 13, wherein the operations further comprise:

obtaining a plurality of unmodified reads of the target polynucleotide, wherein removing the first and second polynucleotide barcodes from the preliminary sequence comprises comparing the preliminary sequence to at least one read of the plurality of unmodified reads of the target polynucleotide.

17. The computer readable medium of claim 13, wherein the target polynucleotide comprises RNA, wherein the target polynucleotide is a first isoform of an RNA sequence, and wherein a sample containing the target polynucleotide contains a second isoform of the RNA sequence, and wherein the first isoform differs from the second isoform.

18. The computer readable medium of claim 13, wherein the first and second polynucleotide barcodes have the same sequence.

19. The computer readable medium of claim 13, wherein the second polynucleotide barcode is a reversed, complementary version of the first polynucleotide barcode.

* * * * *